United States Patent
Chen et al.

(10) Patent No.: US 7,863,553 B2
(45) Date of Patent: Jan. 4, 2011

(54) OPTICAL PROCESSING STRUCTURE FOR A DIGITAL LIGHT PROCESSING PROJECTION DEVICE HAVING PLURAL TOTAL INTERNAL REFLECTION PRISMS AS LIGHT REFLECTING DEVICES

(75) Inventors: Hsi-Chao Chen, Taoyuan Hsien (TW); Junejei Huang, Taoyuan Hsien (TW)

(73) Assignee: Delta Electronics, Inc., Taoyuan County (TW)

( * ) Notice: Subject to any disclaimer, the term of this patent is extended or adjusted under 35 U.S.C. 154(b) by 743 days.

(21) Appl. No.: 11/741,443

(22) Filed: Apr. 27, 2007

(65) Prior Publication Data

US 2008/0084545 A1    Apr. 10, 2008

(30) Foreign Application Priority Data

Oct. 5, 2006    (TW) .............................. 95137122 A

(51) Int. Cl.
   *H01L 27/00* (2006.01)
(52) U.S. Cl. .................................... 250/208.1; 250/226
(58) Field of Classification Search ............. 250/208.1, 250/216, 226; 353/20–38; 359/494, 634; 345/7–9, 84
   See application file for complete search history.

(56) References Cited

U.S. PATENT DOCUMENTS 6,342,971 B1 * 1/2002 Hashizume et al. ......... 359/634
7,267,445 B2 * 9/2007 Huang ......................... 353/81

* cited by examiner

*Primary Examiner*—Que T Le
(74) *Attorney, Agent, or Firm*—Patterson Thuente Christensen Pedersen, P.A.

(57) ABSTRACT

A light processing structure for a digital light processing (DLP) projection device is disclosed. The DLP projection device comprises a plurality of digital micro-mirror devices (DMDs). The optical processing structure comprises a color separation mechanism, a reflecting mechanism and a color combination mechanism, wherein the color separation mechanism utilizes dichroic mirror(s) and a color wheel for splitting light beams into individual colors. The reflecting mechanism includes a plurality of TIR prisms corresponding to the DMDs, respectively. The color combination mechanism utilizes a color-combining prism assembly in which two triangular prisms are assembled with each other. The mentioned mechanism uses a shorter back focal length for the projection lens, thereby reducing the light processing structure and enhancing product quality.

19 Claims, 6 Drawing Sheets

OPTICAL PROCESSING STRUCTURE FOR A DIGITAL LIGHT PROCESSING PROJECTION DEVICE HAVING PLURAL TOTAL INTERNAL REFLECTION PRISMS AS LIGHT REFLECTING DEVICES

This application claims priority to Taiwan Patent Application No. 095137122 filed on Dec. 11, 2006; the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a light processing structure for a digital light processing (DLP) projection device; specifically, it relates to a light processing structure for a DLP projection device with a plurality of digital micro-mirror devices (DMD).

2. Descriptions of the Related Art

FIG. 1 shows a schematic diagram of a digital light-processing projector of Taiwan patent application number 93101928. The application was filed by the applicant of this invention on Jan. 29, 2004. The digital light processing projector mainly comprises a color combination module 200, a light source 300, a color separation module 400, three digital micro-mirror devices 500R, 500G, 500B, and a projection lens 600.

The light source 300 emits a light W to the color separation module 400 through an integration rod 310. The color separation module 400 is used for splitting the light W into three colors R, G and B. Dichroic mirrors 402 and 404 split the color lights R, G and B. Color lights R, G and B are incident to the color combination module 200 through the condenser lens 406, 408 and 410 and reflection mirrors 412, 414, 416, 418, 420 and 422. Color light B is reflected onto an incident plane 242a, while color light G is reflected onto an incident plane 232a. Each color light, R, G and B, is first reflected onto the digital micro-mirror devices 500R, 500G 1'and 500B via air gaps of the total internal reflection (TIR) prisms 220a, 230a and 240a and then reflected and directed through the TIR prisms 220a, 230a and 240a. The projection lens 600 is disposed on the light path of each color light, R, G and B behind the color combination module 200. The back focal length 550 is the back focal length of the projection lens.

Light is an electromagnetic wave and can be analyzed as S and P polarization. The S polarization is normal to the plane constructed by the light progressing direction and the normal of the reflection plane. The P polarization direction is parallel to the plane constructed by light progressing direction and the normal of the reflection plane. When the S and P polarized lights pass through an optical coating layer of the color separation module or the color combination module, the spectrum distribution of the S and P polarized lights will have a wavelength shift if the incident angle thereof is not perpendicular to the optical coating layer. When the incident angle is perpendicular to the optical coating layer, it is called zero degree incidence. The larger the incident angle, the larger the wavelength shift will be.

One of the existing problems in conventional technologies is that the wavelength shift of the aforementioned S and P polarized lights while color separation are inconsistent with that of the S and P polarized lights while color combination. Accordingly, light loss occurs. Another existing problem in the conventional technologies is that the color combination module of 3-chip DLP projectors is assembled by an X-prism in conjunction with three TIR prisms. Consequently, the prisms are larger in volume and weight, thereby adding to the cost. Furthermore, other prior art has developed a DLP projection device with two pieces of DMDs (not shown). This technology adopts both a color wheel as a color separation system for two of the three primary colors and a Philip prism in combination with TIR prisms for the color separation and combination systems. Since this technology uses the one Philip prism for both color separation and combination, not only does the prism have a larger volume and weight, but its projection lens also has a longer back focus length. As a result, there are more difficulties in designing the lens.

According to the above descriptions, the light processing structure of the aforementioned DLP projection device for color separation and combination needs to be redesigned for easier assembly, smaller volume, and lighter weight, as well as consist of more saturated colors to increase product quality.

SUMMARY OF THE INVENTION

One objective of this invention is to provide a light processing structure used in a digital light processing (DLP) projection device, wherein the DLP projection device uses both a color separation mirror and a color wheel as a color separation system, as well as using a color-combining prism assembly comprising two triangular prisms as a color combination system. Since the volume of the color-combining prism assembly is small, the required back focus length of the projection lens is shorter than that of the prior arts so that the loading designed for the lens can be reduced to a lighter weight and a cheaper price.

Another objective of this invention is to provide a light processing structure used in a DLP projection device, wherein the angle design of triangular prisms and the corresponding optical coatings of a color coupling prism can result in consistent wavelength shift in the spectrum distribution of the S and P polarized lights while separating and combining the colors. Consequently, light loss can be avoided and projection image quality can be increased.

To achieve the aforementioned objectives, the invention discloses a light processing structure for a DLP projection device, wherein the DLP projection device comprises a plurality of DMDs. The light processing structure comprises a color separation mechanism, a reflecting mechanism and a color combination mechanism, wherein the color separation mechanism comprises at least one color separation device adapted for splitting the incident light beam into a plurality of incident sub-light beams. The reflecting mechanism comprises a plurality of light reflecting devices for receiving the incident sub-light beams and reflecting the incident sub-light beams onto the DMDs, respectively. The color combination mechanism comprises a color-combining prism assembly and includes two triangular prisms. The hypotenuse of one triangular prism is adjacent to the hypotenuse of the other triangular prism, whereby the reflection and transmission of the incident sub-light beams occurs after receiving the incident sub-light beams processed by the DMDs.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
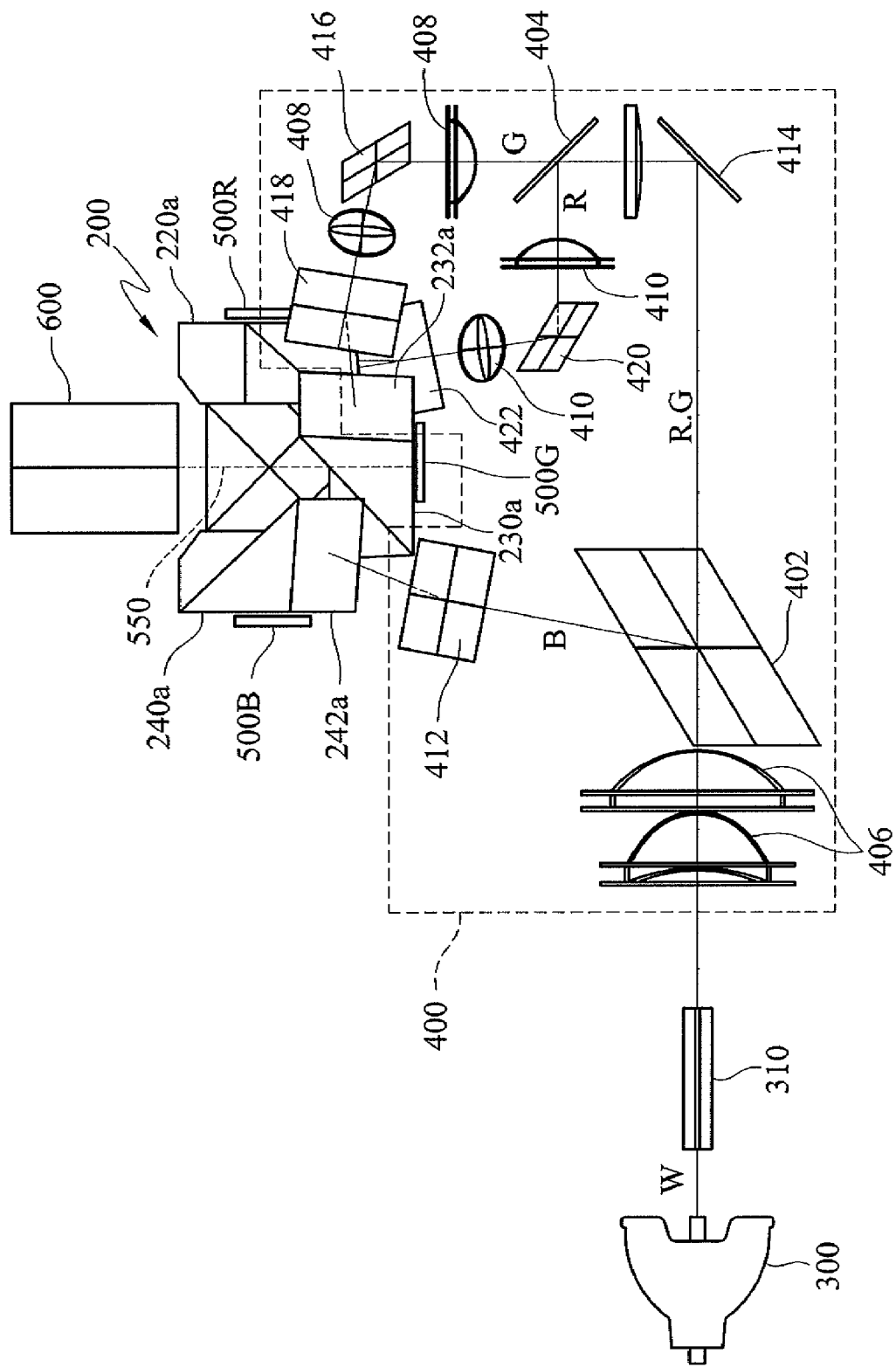
FIG. 1 is a schematic diagram of a prior art digital light processing projection device.
Figure 2:
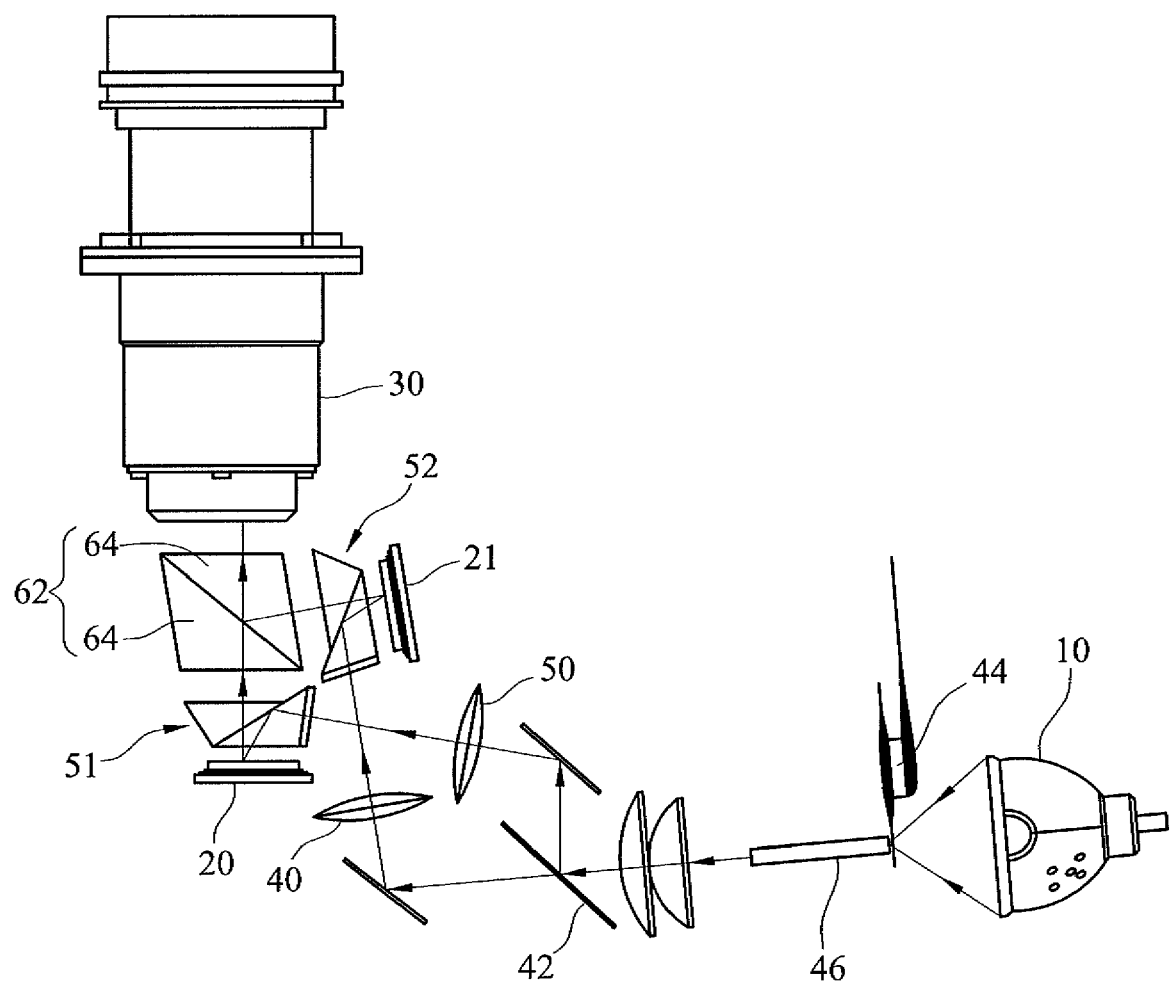
FIG. 2 is a schematic diagram of a horizontal type light processing structure of the invention.

FIG. 2 shows an embodiment of a light processing structure of a DLP projection device, wherein the DLP projection device comprises a light source 10, a plurality of DMDs (shown as two digital micro-mirror devices 20, 21 in the figure), a projection lens 30 and the light processing structure of the invention. The light processing structure comprises a color separation mechanism, a reflecting mechanism and a color combination mechanism.

In detail, the color separation mechanism comprises at least one color separation device adapted for splitting the incident light emitted by the light source 10 into a plurality of incident sub-light beams. In a real embodiment, the color separation device can be a color separation mirror 42. According to the different types of light sources and different requirements for separating light, optical coating layers within the color separation mirror are adapted for splitting the incident light into a plurality of differently colored incident sub-light beams.

Moreover, the color separation mechanism further comprises a color wheel 44 used alongside with the color separation mirror 42 to perform color separation operations for each differently colored light beam. Furthermore, the color separation mechanism can further comprise an integration rod 46 used for the uniformity of each colored beams. In this embodiment, the color wheel 44 is disposed in front of the color separation mirror 42 in relation to the light path, while the integration rod 46 is disposed between the color separation mirror 42 and the color wheel 44.

In the embodiment of the invention as shown in the figure, the color wheel 44 used in conjunction with the color separation mechanism for splitting colors is adapted to split the incident light emitted by the light source 10 into either three primary colors, red, green and blue, or other color combinations, such as red, green, blue and cyan.

Figure 3:
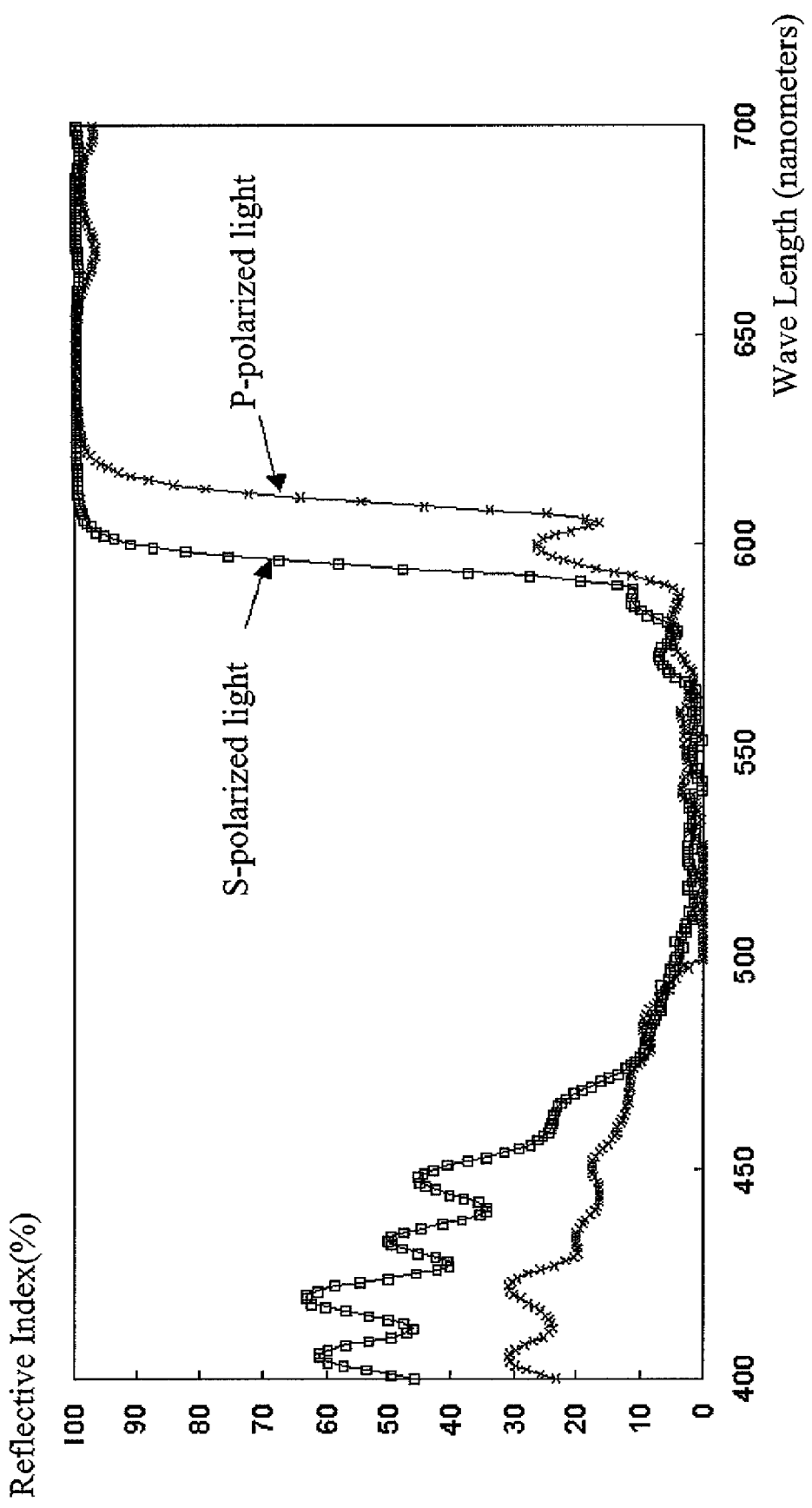
FIG. 3 is a color separation spectrum diagram of a color separation mirror of the invention.

After the incident light emitted by the light source 10 enters the color wheel 44 for splitting, the light is first uniformed by the integration rod, and then color-separated by the color separation mirror 42. The incident light can be split into, for example, a red color light path and a green and blue mixed light path (the green light and the blue light are selected by the color wheel in turn) for reflection into different reflecting devices, respectively, as described in detail later. Moreover, a color separation spectrum diagram of the color separation mirror of the invention is shown in FIG. 3. In this figure, the wavelength shift of the spectrum distribution for S and P polarized light is between 20 nanometers to 30 nanometers.

It should be noted that the color configuration for the color separation mechanism in the aforementioned embodiment is mainly considered to operate with a high pressure mercury lamp adopted by light source 10 in the example. Since the spectrum emitted by the high pressure mercury lamp has a lower red light quantity than the other two lights, a special design of using red light for one channel and the mixed blue and green lights for another channel is made to provide enough red light quantity and prevent uneven distribution of each primary colors while designing the color separation mirror and the color wheel.

However, people skilled in the art can understand that when the DLP projection device uses different kinds of light sources, the separated color lights have to be adjusted accordingly to achieve an efficient use of the light source and high quality of imaging. Certainly, in relation to the light path the color wheel 44 does not need to be disposed in front of the color separation mirror 42 or the integration rod 46. Instead, the color wheel 44 can also be disposed behind the color separation mirror 42 if the light beam can be converged again.

In a preferred embodiment of the invention, the light processing structure can further comprise a first lens 40 and a second lens 50, wherein the first lens 40 is adapted to collect one incident sub-light beam while the second lens 50 is adapted to collect another incident sub-light beam. For example, the first lens 40 is adapted to collect the red sub-light beams while the second lens 50 is adapted to collect the blue and the green incident sub-light beams.

Moreover, referring to FIG. 2, the reflecting mechanism of the invention comprises a plurality of light reflecting devices for receiving the plurality of incident sub-light beams split by the color separation mechanism and for reflecting the plurality of incident sub-light beams onto the DMDs, respectively. The reflecting mechanism first receives the incident sub-light beams on the two light paths through the light reflecting devices respectively and then reflects the light into two DMDs 20, 21, correspondingly. After reflection by the two DMDs 20, 21, the sub-light beams are directly passed through the two light-reflecting devices and emitted into the color combination mechanism. In the preferred embodiment, the light reflecting devices are total internal reflection (TIR) prisms 51, 52.

Preferably, the color combination mechanism of the invention consists of a color-combining prism assembly 62 comprising two triangular prisms 64, wherein the longest inclined plane of one triangular prism 64 is adjacent to the longest inclined plane of the other triangular prisms 64 for assembly into the color-combining prism assembly 62. The color-combining prism assembly 62 is adapted to combine and transmit the incident sub-light beams out towards the projection lens 30 after receiving the incident sub-light beams processed by the DMDs 20, 21.

Figure 4:
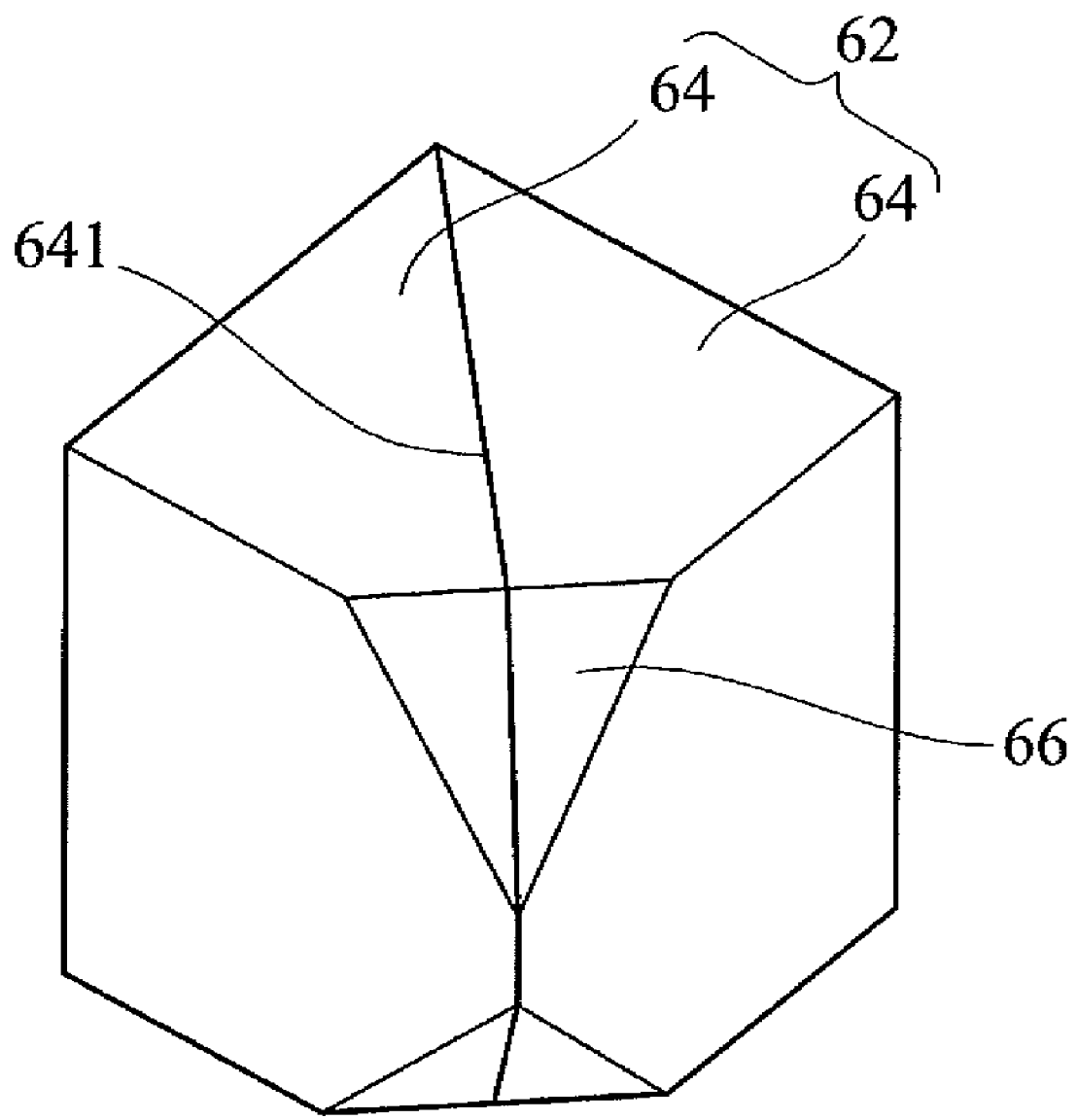
FIG. 4 is a schematic diagram of a color-combining prism assembly of the invention.

In the preferred embodiment, each triangular prism 64 of the color-combining prism assembly 62 is an isosceles triangular prism. Specifically, each base angle between two opposite sides ranges substantially between 40 to 45 degrees. In other words, if the base angles are 45 degrees, the color-combining prism assembly 62 is formed by two isosceles right angular prisms; if the base angles are 40 degrees, the color-combining prism assembly 62 is formed by two triangular prisms with 40, 40 and 100 degree angles. Furthermore, referring to FIG. 4, the figure shows that the isosceles triangular prisms 64 in the preferred embodiment comprise at least a notch which is formed on the base angle of each isosceles triangular prism 64. Adjacent notches of each isosceles triangular prisms 64 jointly define the notch plane 66 for substantially reducing the geometric interference among the color-combining prism assembly 62 and the TIR prisms. The best shape for the notch plane is an equilateral triangle.

Figure 5:
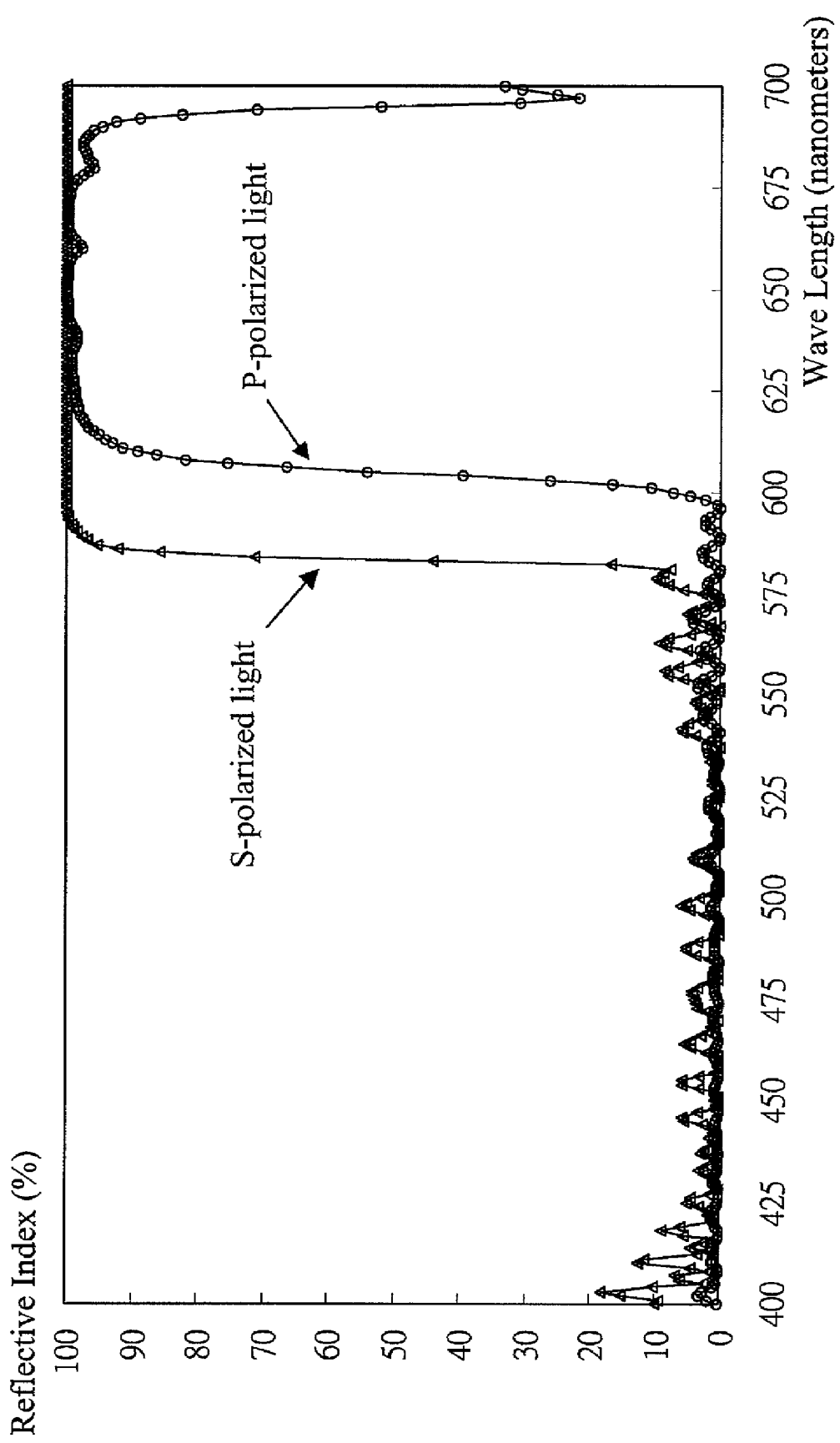
FIG. 5 is a color coupling spectrum diagram of a color-combining prism of the invention.

Moreover, the connection planes of the inclined plane of each triangular prism 64 in the color-combining prism assembly 62 further comprise a multi-layer coating (not shown), covering at least one of the two inclined planes of the triangular prisms 64. The wavelength shift of the spectrum distribution of the S and P polarization on this connection plane must keep consistent with that on the color separation mirror, which is about between 20 and 30 nanometers as shown in FIG. 5. In addition, the aforementioned color-combining paths are further disclosed as the followings. After the red sub-light beam reflects from and the mixed green-blue sub-light beam pass through the multi-layer coating, these two light beams are combined and progress outwards.

In application, the multi-layer coating are coated by a plurality of optical coating layers with high and low refractive indices, wherein the optical coating layer with the high refractive index (H) can be a titanic oxide layer ($TiO_2$ with a refractive index of about 2.1) or of other materials with similar effects. The optical coating layer with the low refractive index (L) can be, for example, a silicon oxide layer ($SiO_2$ with a refractive index of about 1.6) or of other materials with similar effects, wherein the number of composite layers ranges between 60 to 110 layers, preferably, 80 to 100 layers.

Figure 6:
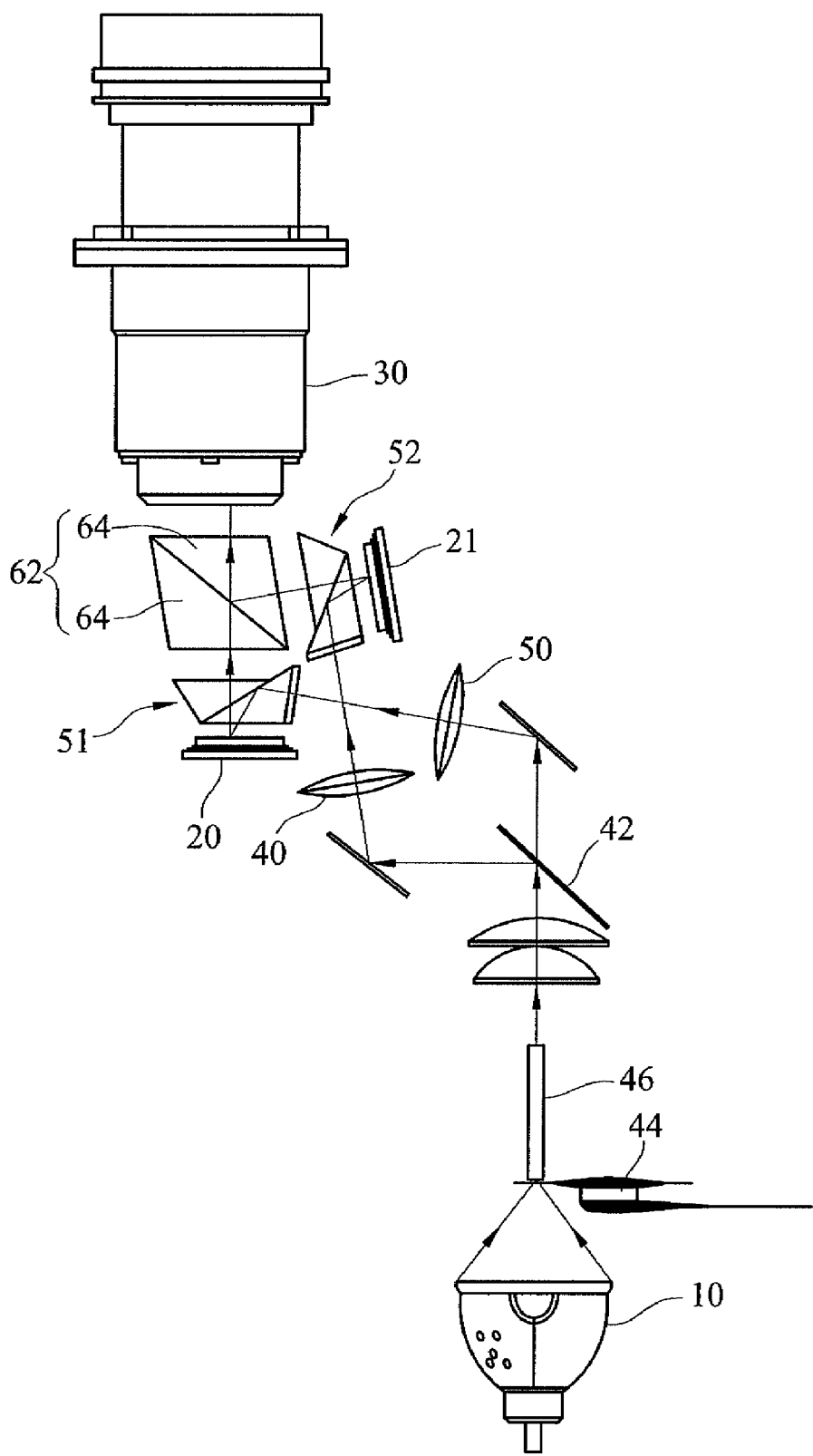
FIG. 6 is a schematic diagram of a vertical type light processing structure of the invention.

It should be noted that the wavelength shift of the spectrum distributions of S and P polarized light is sensitive to the incident angle of lights. Consequently, the smaller the two base angles of the side 641 of the isosceles triangular prisms 64, the smaller the incident angle of the incident light entering the color-combining prism assembly 62 will be. Accordingly, the wavelength shift becomes small. This reduces the cost for the multi-layer coating on the triangular prisms 64 in application. Furthermore, the same effect can also be achieved by replacing the color-combining prism assembly 62 with a dichroic mirror to reduce cost more. Moreover, considering the overall system arrangement, the light path of the light processing structure of the invention does not need to be a horizontal light path layout. A vertical light path layout can be adopted as well. The only requirement is to maintain the same distance for the two light paths behind the color separation mirror as shown in FIG. 6.

In summary, the invention utilizes the color-combing prism assembly 62 comprising two triangular prisms for color combination to reduce the back focal length of the projection lens so that the lens design is much simpler. Furthermore, this invention uses a smaller color-combining prism. Because of its light weight, it is easy to mount the color-combining prism on the system and keep it stable even encountering impacts. Consequently, the life cycle of the DLP projection device can be elongated.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light processing structure for a digital light processing (DLP) projection device, wherein the DLP projection device comprises two digital micro-mirror devices (DMDs), the light processing structure comprising:

a color separation mechanism, comprising:
at least one color separation device adapted for splitting an incident light beam into a plurality of sub-light beams;
a reflecting mechanism, comprising:
two light reflecting devices for receiving the incident sub-light beams and reflecting the sub-light beams onto the two DMDs respectively; and
a color combination mechanism, comprising:
a color-combining prism assembly, including two triangular prisms, one of the inclined planes of one of the triangular prisms being adjacent to one of the inclined planes of the other triangular prism, whereby combining and transmitting the sub-light beams outward after receiving the sub-light beams processed by the DMDs,
wherein each of the two light reflecting devices is a total internal reflection (TIR) prism, and after reflection by the two DMDs, the sub-light beams are directly passed through the two light-reflecting devices and emitted into the color combination mechanism.

2. The light processing structure of claim 1, wherein each of the triangular prisms is an isosceles right angular prism.

3. The light processing structure of claim 1, wherein each of the triangular prisms is an isosceles triangular prism with two base angles, each being substantially between 40 to 45 degrees.

4. The light processing structure of claim 1, wherein the color-combining prism assembly further comprises a multi-layer coated on at least one of the inclined planes of the triangular prisms.

5. The light processing structure of claim 4, wherein a wavelength shift of spectrum for S and P polarized light separated by the color separation mechanism is substantially identical with that combined by the color combination mechanism.

6. The light processing structure of claim 5, wherein the wavelength shift of spectrum for the S or P polarized light is substantially between 20 nanometers to 30 nanometers.

7. The light processing structure of claim 1, wherein the at least one color separation device comprises a color separation mirror adapted to split the incident light beam into a plurality of the sub-light beams having different colors.

8. The light processing structure of claim 7, wherein the color separation mechanism further comprises a color wheel.

9. The light processing structure of claim 8, wherein the color wheel is disposed in front of the color separation mirror in relation to the light path.

10. The light processing structure of claim 9, further comprising an integration rod, disposed between the color separation mirror and the color wheel.

11. The light processing structure of claim 10, wherein the color wheel is disposed behind the color separation mirror in relation to the light path for processing one of the sub-light beams having two mixed colors.

12. The light processing structure of claim 10, wherein the color-combining prism assembly further comprises a multi-layer coated on at least one of the inclined planes of the triangular prisms.

13. The light processing structure of claim 12, wherein the at least one light separation device comprises a light separation mirror adapted to split the incident light beam into a red sub-light beam, a blue-and-green mixed sub-light beam.

14. The light processing structure of claim 13, wherein the red sub-light beam is reflected by the multi-layer, and the blue-and-green mixed sub-light beam is transmitted through the multi-layer and combined with the reflected red sub-light beam, and then the combined light beam is emitted outward.

15. The light processing structure of claim 1, further comprising: a first lens, adapted to collect the incident light beam; and a second lens, adapted to collect at least one of the sub-light beams.

16. The light processing structure of claim 4, wherein the multi-layer comprising at least one optical coating layer with a high refractive index and at least one optical coating layer with a low refractive index.

17. The light processing structure of claim 16, wherein the optical coating layer with a high refractive index is a titanic oxide layer.

18. The light processing structure of claim 16, wherein the optical coating layer with a low refractive index is a silicon oxide layer.

19. The light processing structure of claim 16, wherein the multi-layer comprises approximately 80 to 100 layers.

* * * * *